(12) United States Patent
Yamashita

(10) Patent No.: US 6,788,194 B2
(45) Date of Patent: Sep. 7, 2004

(54) ANTENNA DEVICE AND TIRE PRESSURE MONITORING SYSTEM INCLUDING SAME

(75) Inventor: Shuji Yamashita, Nagoya (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 10/463,360

(22) Filed: Jun. 17, 2003

(65) Prior Publication Data

US 2004/0012489 A1 Jan. 22, 2004

(30) Foreign Application Priority Data

Jul. 18, 2002 (JP) ........................................ 2002-209400

(51) Int. Cl.$^7$ .............................................. A60C 23/00
(52) U.S. Cl. ............. 340/447; 340/870.06; 340/870.18; 455/226.1; 455/226.4; 455/365
(58) Field of Search ........................... 340/447, 870.06, 340/870.18; 343/876, 843, 894; 455/66, 102, 108, 226.1, 226.2, 226.4, 344–345, 677

(56) References Cited

U.S. PATENT DOCUMENTS

| 5,161,252 | A | * | 11/1992 | Higuchi et al. ................. 455/78 |
| 5,203,023 | A | * | 4/1993 | Saito et al. .................. 455/133 |
| 6,112,585 | A | * | 9/2000 | Schrottle et al. ............... 73/146 |
| 6,362,733 | B1 | * | 3/2002 | Momose et al. ............. 340/447 |
| 2001/0008083 | A1 | * | 7/2001 | Brown ......................... 73/146 |
| 2003/0053412 | A1 | * | 3/2003 | Yoshida et al. .............. 370/208 |
| 2004/0008108 | A1 | * | 1/2004 | Kroitzsch et al. ........... 340/442 |

OTHER PUBLICATIONS

Patent Abstract of Japan 05–075578.

* cited by examiner

*Primary Examiner*—Daniel J. Wu
*Assistant Examiner*—Samuel J. Walk
(74) *Attorney, Agent, or Firm*—Beyer Weaver & Thomas LLP

(57) ABSTRACT

An antenna device is composed of a plurality of units of a same structure connected in series. Each of these units includes a single antenna, a level signal generating part for generating a level signal indicative of the intensity of a received signal, or that of its carrier wave, from the antenna, a demodulated signal generating part for generating a demodulated signal by demodulating a received signal from the antenna, a level signal input terminal for receiving an inputted level signal from outside, a demodulated signal input terminal for receiving an inputted demodulated signal from outside, and a selector which serves to compare the level signal generated by the level signal generating part and the inputted level signal received through the level signal input terminal, to select the level signal generated by the level signal generating part and the demodulated signal generated by the demodulated signal generating part if the level signal generated by the level signal generating part is greater than the inputted level signal, to select the inputted level signal and the inputted demodulated signal if the inputted level signal is greater than the level signal generated by the level signal generating part, and to output the selected level signal and the selected demodulated signal through a level signal output terminal and a demodulated signal output terminal, respectively.

4 Claims, 5 Drawing Sheets

ANTENNA DEVICE AND TIRE PRESSURE MONITORING SYSTEM INCLUDING SAME

BACKGROUND OF THE INVENTION

This invention relates to an antenna device adapted to use a plurality of antennas to receive electromagnetic waves and a tire pressure monitoring system including such an antenna device.

In general, electromagnetic waves received by antennas of a radio communication system include not only those which are directly received from the antenna of a transmitting system but also indirect waves which are reflected by an obstacle before being finally received. Since such indirect waves are received with a time delay corresponding to the reflection by the obstacle, they tend to interfere with each other such that the intensity of the waves reaching the receiving antennas changes periodically, becoming repeatedly weaker and stronger at a fixed frequency. This phenomenon is sometimes referred to as the phasing. In the case of a radio broadcasting, the phasing may be unpleasant to the listener but it is not totally impossible to understand the transmitted programs. In the case of a digital data communication, however, the situation is completely different because a part of the data may be lost if the phasing is too large and the receiver may have difficulty in demodulation or playback.

In view of this problem, most digital data radio (wireless) communication systems adopt a so-called "diversity communication" method as a countermeasure against the phenomenon of phasing. The "diversity communication" in this case implies the technology of synthesizing or switching among a plurality of received wave signals so as to reduce the fluctuations in the intensity level of the received wave signals. "Space diversity" is one of the diversity communication methods and is characterized as employing a plurality of antennas located at different positions to receive signals. Levels of the signals received by these antennas are compared and the antenna with the highest level of received signal (or the "reception level") is selected such that only the signal received by this selected antenna is communicated to the signal receiving device.

On the other hand, digital data radio communication systems of different kinds are coming to be installed on vehicles such as automobiles for improving convenience and safety such as air pressure monitoring systems for monitoring the air pressure inside the tires.

Each tire for an automobile has an optimum pressure value set according to the kind of the automobile and to the kind of the tire and it is required or recommended to check the air pressure of each tire before operating the automobile. In the case of a privately owned vehicles, however, it is seldom that the tire pressures are checked before the automobile is operated. Even if the tire pressures are initially checked, the tires develop heat as the automobile is operated and the pressures tend to increase. It is therefore undeniable that most of the automobiles on the road are running with improper tire pressures although improper tire pressures adversely affect the safety of operation and the fuel consumption rate and shorten the useful life time of the tires.

Thus, air pressure monitoring systems (herein referred to as TPMS (or tire pressure monitoring system)) are coming to be used, having an air pressure monitoring sensor installed for each tire, transmitting pressure-indicating detection signals on a weak carrier wave from transmitters, comparing the transmitted signals with a standard reference range by means of a receiver and outputting a warning to the driver if the air pressure inside any tire is found to be improper.

FIG. 3 is a conceptual diagram of such a TPMS. Each tire (or the wheel, more precisely) 1 is provided with a combination air pressure sensor and transmitter (referred to as the "sensor 2") which also serves as an air pressure valve. Its detailed structure will not be described but it may be of any known kind adapted to detect the air pressure inside the associated one of the tires 1 and to transmit a signal indicative of the detected pressure on a weak radio wave such as within the band of 310 MHz–433 MHz. A signal receiver 4 is attached to the main body 3 of the vehicle, serving to receive the wave signals from each of the sensors 2 by means of an antenna 5, to demodulate each of the air pressure signals, to compare it with a standard range and to output a warning through a warning lamp 6 provided on the driver's panel if the detected air pressure is deemed improper.

With a TPMS thus structured, the air pressure inside each tire can be detected on real time and a warning can be outputted to the driver as soon as an improper pressure is detected. Thus, conditions of excessive or insufficient tire pressure can be prevented, the safety of vehicle operation can be improved, unreasonable deterioration of the tires can be avoided, and the fuel consumption rate can be improved. In the United States, for example, almost all new automobiles to be sold from November, 2003 will be required to have such a system installed.

With a TPMS as described above, however, signal reception by a single antenna 5 has not always been reliable for several reasons such that the waves from the sensors 2 are weak, that the direction of wave transmission changes rapidly as the tires 1 rotate and that there are various obstacles for the wave transmission inside the automobile as well as inside the tire housing and also depending on the type of the automobile. FIG. 4 shows an example of signal level characteristics A, B, C and D when signals from the sensors 2 for the four tires 1 of an automobile are received by a single antenna 5. In this example, what is important is that each characteristic has a portion (hatched) F, G, H or I which is below a threshold level E and hence not detectable. The existence of such undetectable portions is probably due to rapid changes in the direction of wave transmission as the tires rotate and the existence of obstacles in the automobile, as explained above. Such undetectable portions may be eliminated if the power of signal transmission from the sensors 2 is increased but the transmission power is basically limited to be weak and since there is a limit to the power capacity of the sensors 2, it is not a practical solution to the problem.

For eliminating such undetectable portions from received signals, Japanese Patent Publication Tokkai 5-75578, for example, has disclosed the use of an antenna device with space diversity explained above, comprising two or more antennas. FIG. 5 shows the basic structure of a TPMS thus improved by making use of a space diversity method with a plural number n (which is 4 in this example) of antennas 5a, 5b, 5c and 5d connected to a receiver 4 through a selecting device 7. The selecting device 7 serves to compare the intensities of waves received by these antennas 5a–5d and to select one of them determined to be receiving the strongest wave. With a TPMS thus structured, therefore, the wave from each air pressure sensor-transmitter 2 can be received at all times such that its intensity will not become below the lowest threshold value E and the problem explained above with reference to FIG. 4 can be obviated by placing an appropriate number of antennas 5a–5d at appropriate locations on the main vehicle body 3.

There is a further room for improvement, however, for such a prior art TPMS simply adopting the space diversity method as shown in FIG. 5. For example, a prior art TPMS of this type with a certain plural n-number of antennas may be adequate for a certain kind of automobiles but it may not be adequate for an automobile of another kind, such another kind of automobile requiring a larger plural m-number of antennas to obviate the problem described above. In other words, the number of antennas and hence the number of input data to be compared by the selecting device 7 is fixed and not variable with such a prior art TPMS.

SUMMARY OF THE INVENTION

It is therefore a general object of this invention in view of the above to provide an improved TPMS which can be used effectively on an automobile of any kind.

It is a more specific object of this invention to provide an antenna device structured such that a different antenna device with a desired different number of antennas can be easily formed by merely adding a unit.

It is another object of this invention to provide a TPMS including such an antenna device.

An antenna device embodying this invention is characterized firstly as comprising a plurality of units of a same structure connected in series and secondly wherein each of these units comprises a single antenna, a level signal generating part for generating a level signal indicative of a reception level by the antenna, a demodulated signal generating part for generating a demodulated signal by demodulating a received signal from the antenna, a level signal input terminal for receiving an inputted level signal from outside, a demodulated signal input terminal for receiving an inputted demodulated signal from outside, and a selector which serves to compare the level signal generated by the level signal generating part and the inputted level signal received through the level signal input terminal, to select the level signal generated by the level signal generating part and the demodulated signal generated by the demodulated signal generating part if the level signal generated by the level signal generating part is greater than the inputted level signal, to select the inputted level signal and the inputted demodulated signal if the inputted level signal is greater than the level signal generated by the level signal generating part, and to output the selected level signal and the selected demodulated signal through a level signal output terminal and a demodulated signal output terminal, respectively. In the above, "units" are each intended to be a device which can be handled as an independent device and can be freely incorporated into a system and "reception level" is intended to mean the intensity of the received signal, or more precisely the intensity of the carrier wave for the received signal (or the carrier wave level). The reception level may be an instantaneous level of the signal (or the wave) or an average value taken over a specified length of time. Such a specified length of time over which the averaging is to be done should preferably be as short as possible.

With such an antenna unit with a plurality of antennas, two or more units are connected in series such that between each of the mutually adjacent pairs of these units the level signal output terminal and the demodulated signal output terminal of one of each mutually adjacent pair are connected respectively to the level signal input terminal and the demodulated signal input terminal of the other of the pair to establish space diversity. The number of units to be connected in series can be adjusted easily according to this invention and hence antenna units with different types of space diversity can be easily accommodated.

A tire pressure monitoring system embodying this invention may be characterized as comprising an antenna unit with a plurality of antennas as explained above and sensors each serving to detect an air pressure inside a corresponding one of tires of a vehicle and to transmit a detection signal indicative of the detected air pressure on electromagnetic waves. Tire pressure monitoring systems thus characterized are advantageous because systems with different types of space diversity appropriate for different kinds of vehicles such as automobiles can be easily provided merely by varying the number of the units to be connected in series in the antenna system.

DETAILED DESCRIPTION OF THE INVENTION

The invention is described next by way of examples of a tire pressure monitoring system (TPMS) with reference to drawings but these examples are intended merely to explain the basic idea of the invention and not to limit the scope of the invention. Some of the details believed to be known by persons skilled in the relevant arts are left unexplained in order to simplify the description.

Figure 1A:
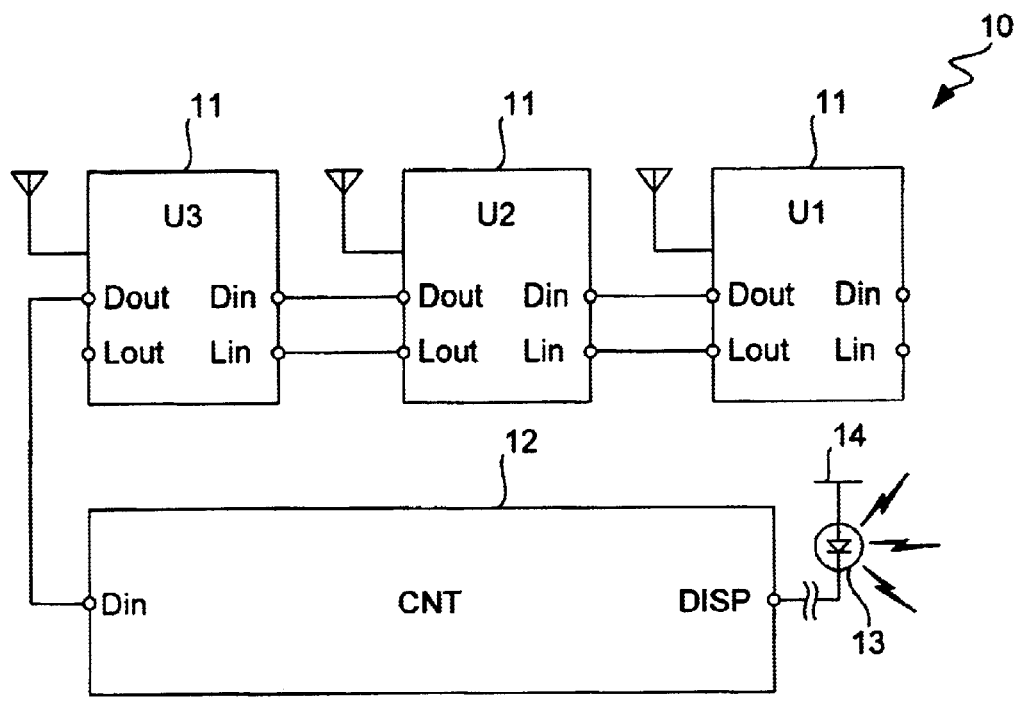
FIG. 1A is a block diagram of a portion of a TPMS embodying this invention and FIG. 1B is a block diagram of each of the units shown in FIG. 1A.
Figure 3:
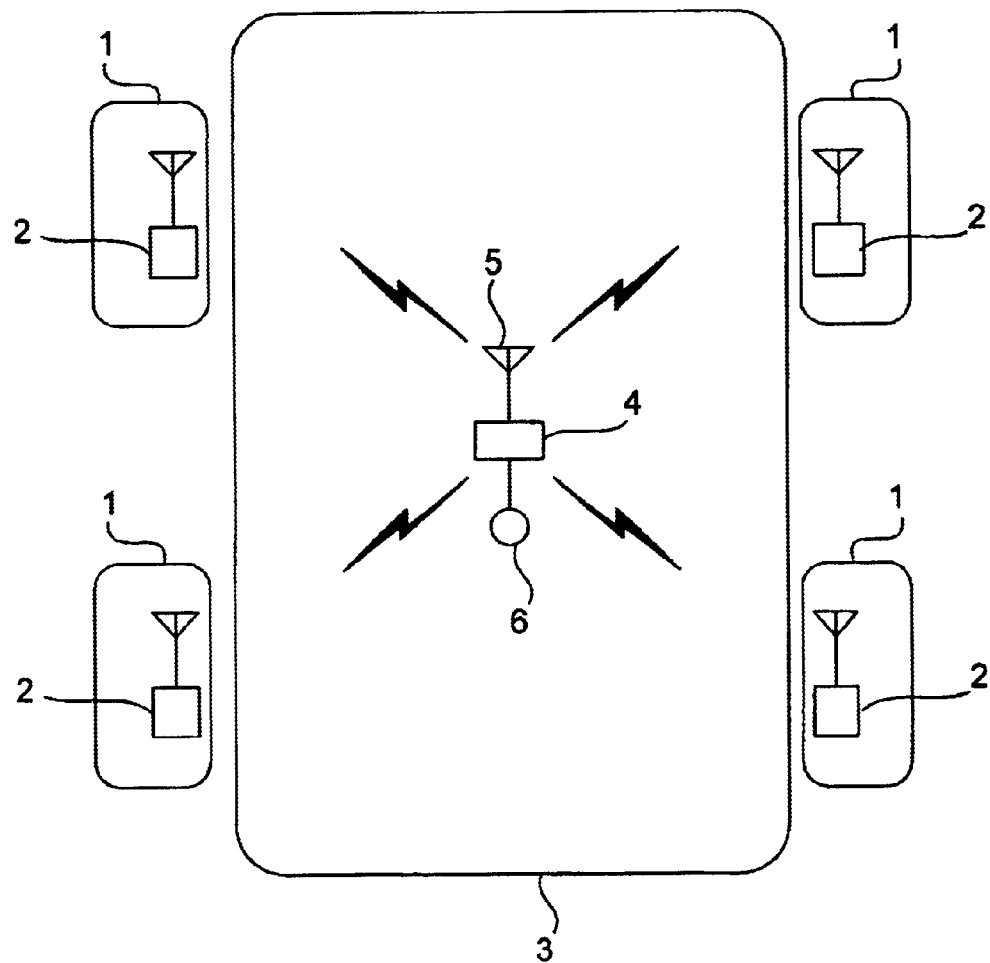
FIG. 3 shows the basic concept of a TPMS.
Figure 4:
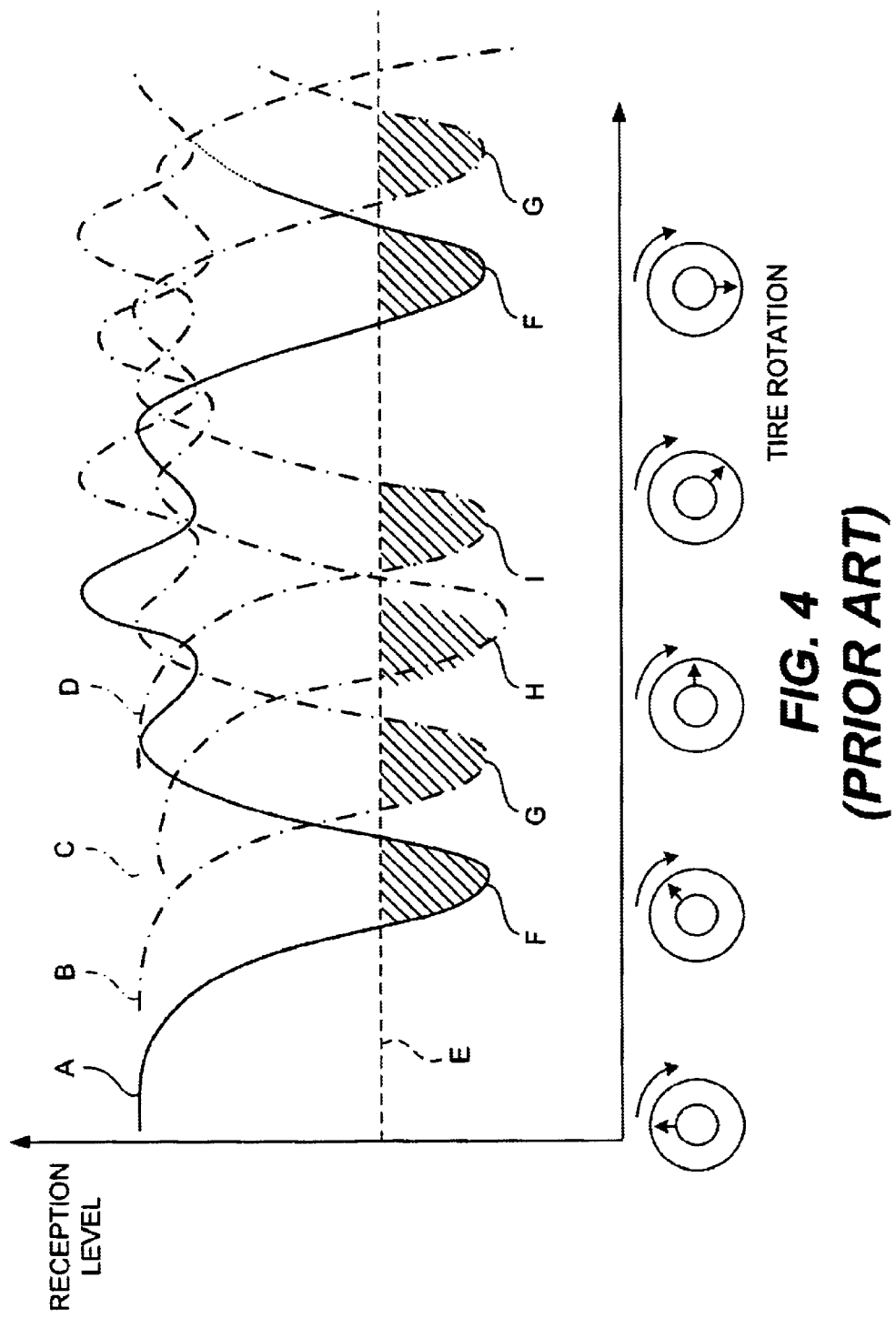
FIG. 4 is a characteristic diagram showing the levels of received signals from each of the air pressure sensors of FIG. 3 received by a single antenna.
Figure 5:
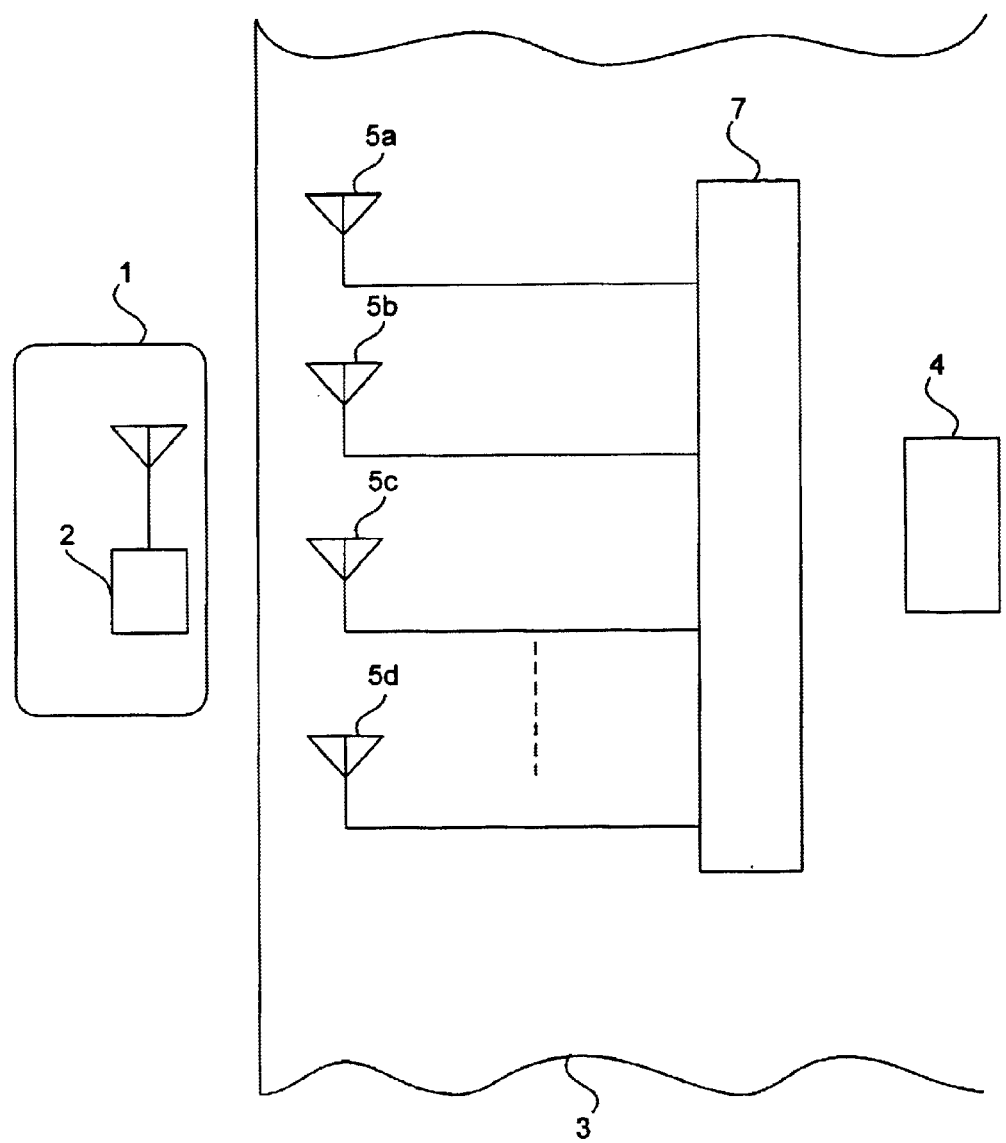
FIG. 5 shows the concept of a prior art TPMS adopting a space diversity method.

FIG. 1A shows a portion of a TPMS 10 embodying this invention by a block diagram, including, in addition to air pressure sensor-transmitters 2 attached to the tires 1 on a vehicular main body 3 as shown in FIG. 3, a plural n-number (which is three in the illustrated example for convenience) of units 11 (or U1, U2 and U3) set on the main body 3, one control unit (CNT) 12, and a warning lamp 13 set on the driver's panel in the main body 3. The warning lamp 13 is connected between the light signal output terminal DISP of the control unit 12 and a power source line 14 and is adapted to emit light of a specified warning color such as yellow or red when DISP is brought to the ground voltage level by an internal operation of the control unit 12. Although not shown in the figure for the sake of clarity, a voltage from the automobile battery is supplied to each of the units (U1–U3) 11 and the control unit 12 through an ignition key switch.

Figure 1B:
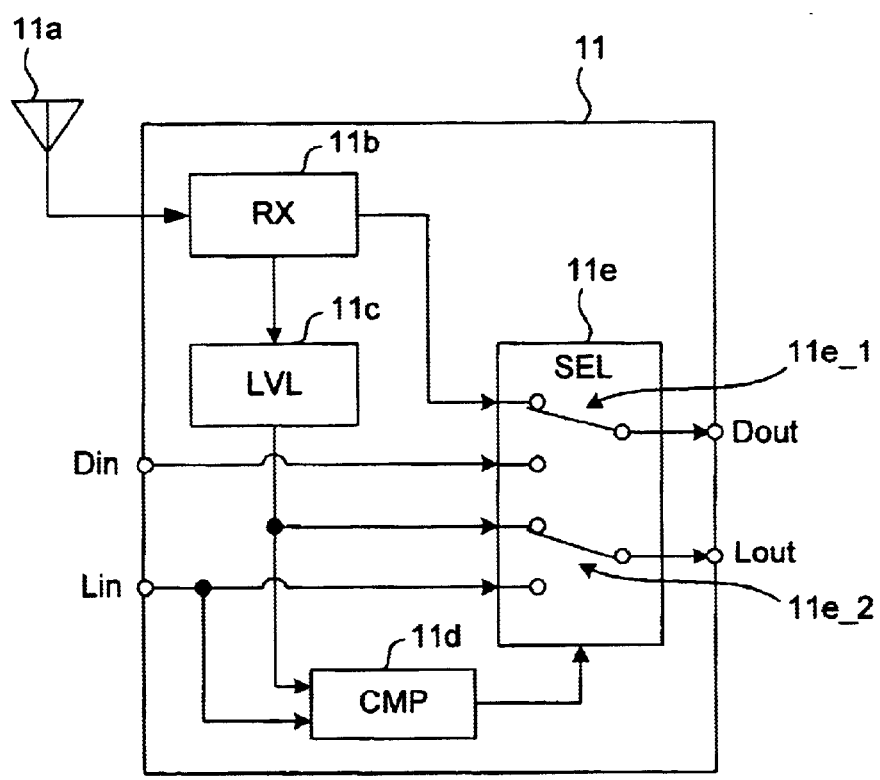

Each of the units (U1–U3) 11 is structured as shown in FIG. 1B, having an antenna 11a, a demodulated signal generating part (or a demodulator RX) 11b, a level signal generating part (LVL) 11c, a comparator circuit (CMP) 11d and a selector circuit (SEL) 11e. The antenna 11a is adapted to receive waves within a specified high range of frequency including the frequency of transmitted waves from the sensors and to transmit the received high-frequency wave to the demodulator 11b.

The demodulator 11b serves to detect the wave received from the antenna 11a to demodulate it into a base band signal and to transmit this demodulated signal to the selector circuit 11e. The level signal generating part 11c generates a level signal indicative of the intensity of this received high-frequency wave (or the carrier wave intensity) and transmits the generated level signal both to the selector circuit 11e and to the comparator circuit 11d.

The comparator circuit 11d and the selector circuit 11e together form what is 10 herein considered as a selector means for comparing the level signal generated within its own unit and an externally received level signal taken into the unit through a level signal input terminal $L_{in}$, generating a selection indicating signal according to the result of this comparison and transmitting this selection indicating signal thus generated to the selector circuit 11e.

The selector circuit 11e has two switch elements (first switch element 11e1 and second switch element 11e2). The first switch element 11e1 serves to alternatively select between the demodulated signal generated within its own unit and an externally received modulated signal taken into the unit through a demodulated signal input terminal $D_{in}$ and to transmit the selected one of the demodulated signals out through a demodulated signal output terminal $D_{out}$. The second switch element 11e2 serves to alternatively select between the level signal generated within its own unit and an externally received level signal taken into the unit through the level signal input terminal $L_{in}$ and to transmit the selected one of the level signals out through a level signal output terminal $L_{out}$.

The operational relationship between the result of comparison by the comparator circuit 11d and the selection made by the selector circuit 11e is as follows.

(1) If the level signal generated within its own unit indicates a higher level than that corresponding to the externally received level signal received through the level signal input terminal $L_{in}$, the two switch elements 11e1 and 11e2 are set as shown in FIG. 1B such that the modulated signal and the level signal generated within its own unit are selected and outputted respectively through the demodulated signal output terminal $D_{out}$ and the level signal output terminal $L_{out}$.

(2) If the level signal generated within its own unit indicates a lower level than that corresponding to the externally received level signal received through the level signal input terminal $L_{in}$, both switch elements 11e1 and 11e2 are connected to the opposite junctions such that the externally received modulated signal and the externally received level signal received respectively through the demodulated signal input terminal $D_{in}$ and the level signal input terminal $L_{in}$ are selected and outputted respectively through the demodulated signal output terminal $D_{out}$ and the level signal output terminal $L_{out}$.

(3) If the level signal generated within its own unit and the externally received level signal indicate about the same levels, it does not matter whether the switch elements 11e1 and 11e2 are set according to (1) or (2).

When three of such units 11 (U1, U2 and U3) are to be used together, they are connected as shown in FIG. 1A, that is, the demodulated signal output terminal $D_{out}$ and the level signal output terminal $L_{out}$ of one of the units 11 (say, the "first unit U1") are respectively connected to the demodulated signal input terminal $D_{in}$ and the level signal input terminal $L_{in}$ of another of the units 11 (say, the "second unit U2"), the demodulated signal output terminal $D_{out}$ and the level signal output terminal $L_{out}$ of the second unit U2 are respectively connected to the demodulated signal input terminal $D_{in}$ and the level signal input terminal $L_{in}$ of the third unit U3, and the demodulated signal output terminal $D_{out}$ of the third unit U3 is connected to the demodulated signal input terminal $D_{in}$ of the control unit 12. In other words, the three units 11 are connected in series.

The demodulated signal input terminal $D_{in}$ and the level signal input terminal $L_{in}$ of the first unit U1 and the level signal output terminal $L_{out}$ of the third unit U3 are open terminals not connected to anything. They may be left in this unconnected condition but in view of the possibility of being subjected to the effects of noise, it is preferable to ground them.

With the three units 11 thus connected in series, if the level signal from the first unit U1 is the largest, the selector circuit 11e of the first unit U1 makes its switch elements 11e1 and 11e2 switched in the condition (1) explained above and those of the remaining units (U2 and U3) will be in the condition (2). As a result, the demodulated signal from the first unit U1 is outputted from the demodulated signal output terminal $D_{out}$ of the third unit U3. If the level signal from the second unit U2 is the largest, the selector circuit 11e of the second unit U2 makes its switch elements 11e1 and 11e2 switched in the condition (1) explained above and those of the remaining units (U1 and U3) will be in the condition (2). As a result, the demodulated signal from the second unit U2 is outputted from the demodulated signal output terminal $D_{out}$ of the third unit U3. If the level signal from the third unit U3 is the largest, the selector circuit 11e of the third unit U3 makes its switch elements 11e1 and 11e2 switched in the condition (1) explained above and those of the remaining units (U1 and U2) will be in the condition (2). As a result, the demodulated signal from the third unit U3 is outputted from the demodulated signal output terminal $D_{out}$ of the third unit U3.

Figure 2A:
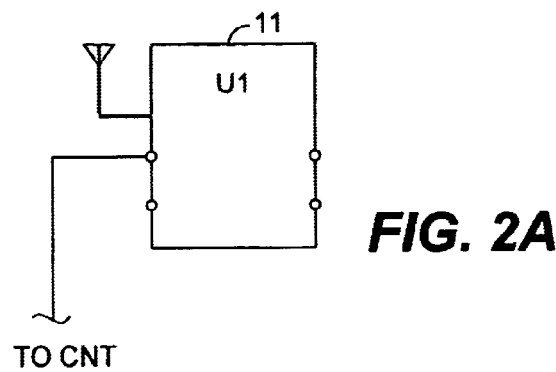
FIGS. 2A, 2B, 2C and 2D, together referred to as FIG. 2, show examples of a different number of units connected in series.
Figure 2B:
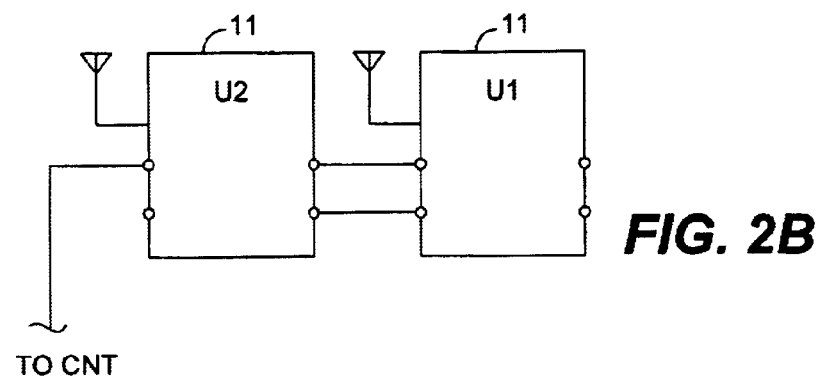
Figure 2C:
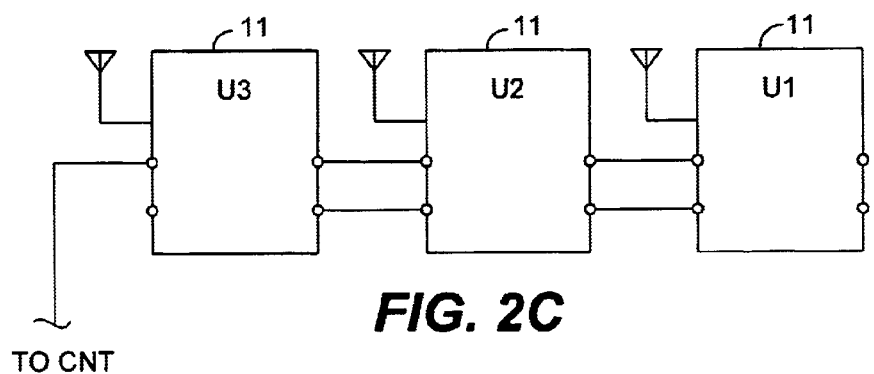
Figure 2D:
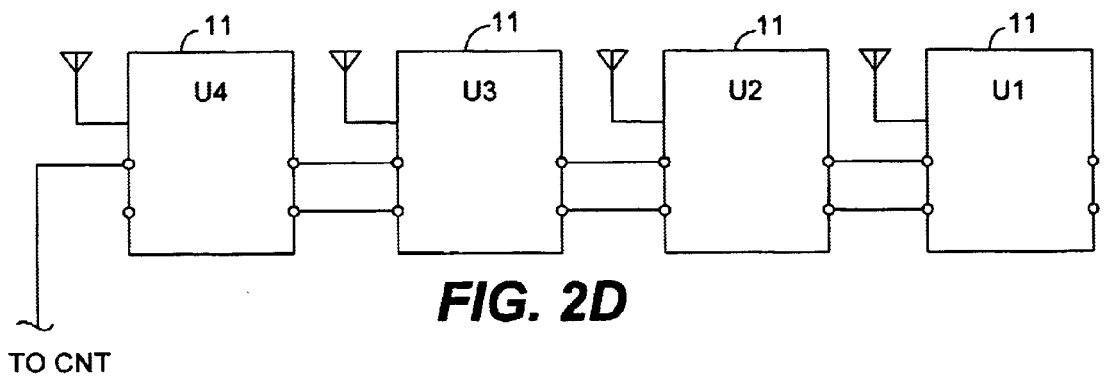

Thus, the air pressure monitoring system 10 shown in FIG. 1A represents space diversity with three antennas 11a of the three units U1–U3 distributed appropriately in space. Since this system is formed by connecting the three units U1–U3 in series, the number of antennas can be easily changed as shown in FIG. 2. If one antenna is sufficient (although this is not a case of space diversity), an air pressure monitoring system can be formed with only one unit U1 as shown in FIG. 2A. If two antennas are required but sufficient, an air pressure monitoring system can be formed with two units U1 and U2 but no more, as shown in FIG. 2B. If three antennas are required but sufficient, an air pressure monitoring system can be formed with three units U1, U2 and U3 but no more, as shown in FIG. 2C. If four antennas are required but sufficient, an air pressure monitoring system can be formed with four units U1, U2, U3 and U4 but no more, as shown in FIG. 2D.

Thus, different air pressure monitoring systems can be prepared merely by varying the number of identically structured units to be connected in series. In other words, it is sufficient to produce units of the same structure in order to provide air pressure monitoring systems with different kinds of space diversity appropriate for automobiles of different types.

What is claimed is:

1. An antenna device comprising a plurality of units of a same structure connected in series, each of said units comprising:

a single antenna;

a level signal generating part for generating a level signal indicative of a reception level by said antenna;

a demodulated signal generating part for generating a demodulated signal by demodulating a received signal from said antenna;

a level signal output terminal;

a demodulated signal output terminal;

a level signal input terminal for receiving an inputted level signal from outside;

a demodulated signal input terminal for receiving an inputted demodulated signal from outside; and a selector which serves to compare said level signal generated by said level signal generating part and said inputted level signal received through said level signal input terminal, to select said level signal generated by said level signal generating part and said demodulated signal generated by said demodulated signal generating part if said level signal generated by said level signal generating part is greater than said inputted level signal, to select said inputted level signal and said inputted demodulated signal if said inputted level signal is greater than said level signal generated by said level signal generating part, and to output said selected level signal and said selected demodulated signal through said level signal output terminal and said demodulated signal output terminal, respectively.

2. The antenna device of claim 1 wherein said plurality of units are connected in series so as to form one or more mutually adjacent pairs, and wherein between each of the mutually adjacent pairs of said units the level signal output terminal and the demodulated signal output terminal of one of said each mutually adjacent pair are connected respectively to the level signal input terminal and the demodulated signal input terminal of the other of said each mutually adjacent pair.

3. A tire pressure monitoring system comprising:

a sensor serving to detect an air pressure inside a tire of a vehicle and to transmit a detection signal indicative of said detected air pressure on electromagnetic waves; and an antenna device serving to receive said detection signal on electromagnetic waves from said sensor, to compare said detected air pressure indicated by said detection signal with a predetermined pressure range, and to output an warning if said detected air pressure is outside said pressure range, said antenna device including a plurality of units of a same structure connected in series, each of said units comprising:

a single antenna;

a level signal generating part for generating a level signal indicative of a reception level by said antenna;

a demodulated signal generating part for generating a demodulated signal by demodulating a received signal from said antenna;

a level signal output terminal;

a demodulated signal output terminal;

a level signal input terminal for receiving an inputted level signal from outside;

a demodulated signal input terminal for receiving an inputted demodulated signal from outside; and a selector which serves to compare said level signal generated by said level signal generating part and said inputted level signal received through said level signal input terminal, to select said level signal generated by said level signal generating part and said demodulated signal generated by said demodulated signal generating part if said level signal generated by said level signal generating part is greater than said inputted level signal, to select said inputted level signal and said inputted demodulated signal if said inputted level signal is greater than said level signal generated by said level signal generating part, and to output said selected level signal and said selected demodulated signal through said level signal output terminal and said demodulated signal output terminal, respectively.

4. The tire pressure monitoring system of claim 3 wherein said plurality of units are connected in series so as to form one or more mutually adjacent pairs, and wherein between each of the mutually adjacent pairs of said units the level signal output terminal and the demodulated signal output terminal of one of said each mutually adjacent pair are connected respectively to the level signal input terminal and the demodulated signal input terminal of the other of said each mutually adjacent pair.

* * * * *